United States Patent Office 2,893,850
Patented July 7, 1959

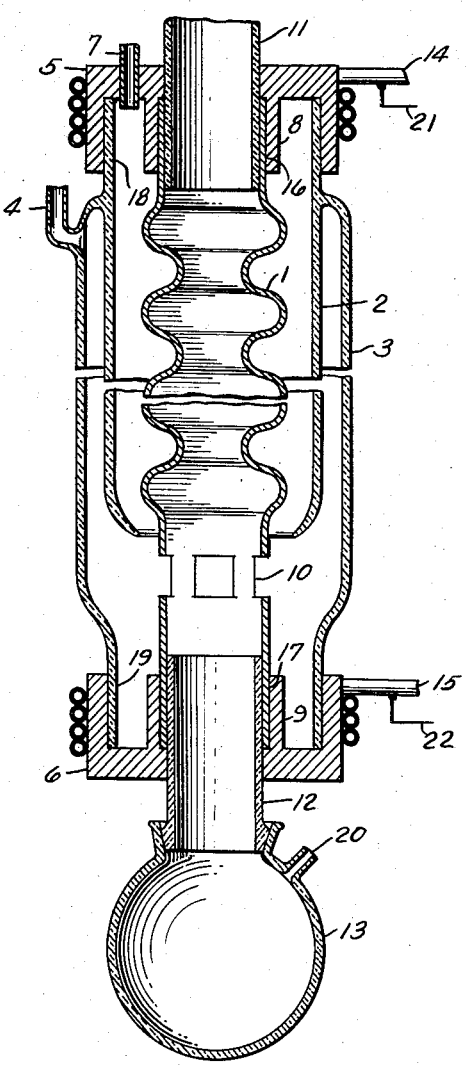

2,893,850

APPARATUS FOR THE PRODUCTION OF ELEMENTAL SILICON

Foord von Bichowsky, Wilmington, Del.

Original application August 3, 1956, Serial No. 601,978. Divided and this application July 1, 1957, Serial No. 670,613

6 Claims. (Cl. 23—284)

The present invention concerns an improved method adapted to give a better deposition of elemental silicon upon heated surfaces by directing the reaction of formation through the use of concave noncohesive metallic surfaces and other steps and/or means, all as subsequently to be described and claimed.

This application is a division of my copending, now abandoned, application for Improved Method for the Production of Elemental Silicon, Serial No. 601,978, filed August 3, 1956.

The prior art covering the manufacture of hyper-pure silicon of electrical or transistor grade may be classified under three broad headings viz:

I. Reacting silicon chloride with the vapor of a metal to form crystals of silicon and the chloride of the metal.

II. Decomposing a hydrogen compound of silicon by heat.

III. Reacting silicon tetrachloride with hydrogen in the presence of a heated element to give hydrogen chloride and elemental silicon.

From what follows it will be seen that the present invention belongs within this last classification.

Nearly fifty years ago J. N. Pring and W. Fielding heated a carbon rod by electrical means to incandescence in an atmosphere of silicon tetrachloride and hydrogen and observed the formation of hard crystals of Si upon the convex surface of the carbon rod. The reaction involved may be represented by the equation $$SiCl_4 + 2H_2 = Si + 4HCl$$

As was to be expected, considering the high temperature used, the silicon thus prepared was contaminated by carbon. In order to avoid such contamination other workers have replaced the carbon rod by a filament of tungsten or other suitable refractory metal, e.g. tantalum, but their equipment is essentially that of the earlier workers. In its simplest form it consists of one or more filaments, say of tungsten, suspended within a transparent cylinder through which a mixture of the two reactants is passed. The filament or filaments are heated by conducting an electrical current through them. As the solid filaments are small in diameter and the cylindrical housing, to avoid heat losses, is relatively large in diameter only a very small portion of the mixture of vapor and gas comes into contact with the heated, essentially convex surface or surfaces but as the filament grows, due to the deposition thereon of Si, the phenomenon observed in 1876 by L. Troost and P. Hautefeuille often becomes noticeable. This effect leads to the transference of silicon from the hot zone to places having a lower temperature such as the walls of the transparent cylinder, where it can cause mechanical and/or chemical difficulties perhaps by cohesion and/or by interaction with the silicon oxygen compounds in the materials of the walls. Also because of the incomplete contact of the mixed reactants with the heated surface of a filament it has been necessary to recycle the reagents after first removing or venting off the hydrochloric acid formed. This removal is done in order to keep the equilibrium conditions more favorable and to conserve the very pure silicon tetrachloride, but even this step is associated with difficulties. These arise, for example, because silicon tetrachloride has an appreciable vapor pressure at room temperature and therefore efficient cooling of the corrosive products must be employed, sometimes with supplemental adsorption, in order to recover the $SiCl_4$ in pure form from the spent reaction gases whose volume has increased somewhat due to the formation of 4 volumes of hydrochloric acid from each 3 volumes of the initial reactants used. In addition such deep cooling of the reactants with subsequent reheating to high temperature following every passage through the reactor is thermally inefficient.

Applicant, in order to overcome these drawbacks and for other considerations, began work on the problem of discovering how to direct the deposition of silicon from such a general type of reaction so that the silicon might be removed more readily from the surface of deposition and also on the problem of obtaining, from the reaction, a practically theoretical yield.

As a result of those efforts a unique type of apparatus has been invented and a modus operandi discovered which enables one through their union to obtain both of the above mentioned objectives beside other unexpected advantages.

In essence the new process consists in directing the reaction, hydrogen and silicon tetrachloride vapor, into a horizontally corrugated vertical metallic cylinder so constructed that turbulent flow occurs therein whereby at first the mixed reactants come into contact with a hot noncohesive metallic surface. As a result the reaction goes essentially quantitatively and probably due to mechanical distortion caused by the deposited silicon the corrugated cylinder tends to expand or contract thus facilitating the loosening of the silicon from the concave walls so that it can fall or be caused to fall into a suitable collecting vessel. The gases leaving the apparatus usually consist almost exclusively of hydrochloric acid.

The aforementioned thin metallic cylinder employed, which may vary in wall thickness from a few tenths of a millimeter, or less, to one or more millimeters depending in part upon whether it is composed of one metal or of a series of metal layers formed either by plating or cladding or both and whose internal diameter varies along the median portion of its length, is contained within an electrically non-conducting siliceous, preferably transparent shell which is divided into two parts by a concentric septum or partition. During a run, hydrogen is introduced between this partition and the corrugated metallic cylinder and the silicon tetrachloride is added between the outer wall of the container and the other side of the septum. These two reagents which thus become heated by radiation. conduction and/or convection during their downward passage enter into the metallic cylinder via openings in its lower wall and then flow upward through the corrugated part of the cylinder.

Due to the alternate narrowing and widening of the cylinder, because of the corrugations, a heavy turbulence is imparted to the now mixed hot reactants so that all portions of the mixture come, at least once, into contact with the heated metallic wall. The corrugated cylinder generally is heated by the direct passage through it of an electric current. In such cases the electrical contact is made at both ends of the tube, by means of water cooled sleeve connectors.

Reference now is made to the attached drawing which shows a broken vertical cross section through the apparatus.

The centrally corrugated cylinder 1 is of a noncohesive metal such as tantalum, with the openings 10 for admitting the heated reactants. In this drawing four rectangular openings are indicated but their number may be varied and also their size and shape. The combined area of the openings is approximately equal to the average horizontal cross sectional area of the roughened tube. Because of these openings the metal between them has less cross sectional area than that of the remainder of the tube, consequently overheating with associated premature reaction may occur at the narrower strips between the openings 10. It has been found that this overheating may be avoided by thickening the strips. This is readily done by cutting through the metal tube at the top, bottom and along one side of the desired openings and then folding the thus formed flaps back onto the uncut strips and welding them in place. In this way the electrical conductivity of the tube remains practically undisturbed.

The tube 1 is contained in a cylindrical housing 3, for example, of "vycor" glass drawn down somewhat at the ends 18 and 19 and containing a partition or septum 2; 5 and 6 are caps of a non-contaminative material such as aluminium and are cooled by circulating water through the metal coils 14 and 15 which also may serve as connection terminals 21 and 22 for the electric heating current. In these caps are situated the contact sleeves 8 and 9 into which the uncorrugated ends 16 and 17 of tube 1 fit snugly. 4 is the inlet tube for the pure silicon tetrachloride, employed either alone or more or less diluted with hydrogen, 7 represents the inlet for the purified hydrogen. 11 is a refractory tube of fused silica serving as an outlet from which the hydrochloric acid gas produced during the reaction may escape. If desired 11 may be part of a condensing system. A tube 12, likewise of silica, is fitted tightly into the lower end of the metal cylinder 1. This tube terminates in a standard outside tapered joint to which is attached the collecting flask 13 for the dislodged silicon. Through this an inert gas, such as argon, may be introduced into the apparatus before starting a run so as to displace the air in the apparatus or to stop the reaction. Before making a run all joints are made gas tight, especially the opening in the caps 5 and 6 through which the tubes of fused silica 11 and 12 pass. For this purpose a sealing agent such, for example, as a de Kotinski type of cement may be used.

Having now described a preferred set-up, two examples will be given of the operation of this method for directing the formation of elemental silicon on concave non-cohesive surfaces.

*Example 1.*—The entire apparatus is flushed thoroughly by argon introduced via 20 and escaping through 11. When every trace of air has been displaced the source of pure hydrogen is connected at 7 and the argon entering through 20 is turned off. The tube 1 is slowly heated by the passage through it of an electric current produced by a variable potential between 50 and 100 volts. The temperature of the tube may be determined by measuring it with an optical pyrometer. The hydrogen is passed through the set-up at a slow rate until the apparatus has become hot enough to drive out any traces of occluded or adsorbed moisture. Whereupon the rate of hydrogen ingress is increased and the tube is heated to the bright incandescence occurring at about 1150° C. Next the rate of hydrogen flow, measured by a flow meter, is adjusted to 12 liters per hour, at standard conditions. Silicon tetrachloride, previously double distilled, is fed through 4 into the space between the outer wall and the septum at a rate of 25 ml./hour. When it is desired to shut down the apparatus the current and the flow of $SiCl_4$ are turned off, the tube allowed to cool to room temperature first in hydrogen and then in argon. Afterwards the flask 13 with the contained silicon is removed at its joint with 12. The high grade silicon thus prepared is ready for fusing into rods or other treatment.

*Example 2.*—In this method the silicon tetrachloride of the preceding example is replaced by silicon tetrachloride vaporized in hydrogen. The proportioning of the hydrogen used for vaporization to that introduced via 7 is in the ratio of 1 to 3. The total amount of hydrogen and of silicon tetrachloride introduced into the reactor is approximately the same as in the first example. The other steps of the operation are identical with those in Example 1.

In these examples the entire reaction surface has been heated by passing an electric current through it but if it is desired to use but a portion of its length then the tube can be heated by a high frequency current with the induction coil encircling part of the apparatus. In this case care should be taken to keep the metal caps 5 and 6 out of the field of the exciting coil.

The size of the corrugations, along the central part of tube 1, which cause a turbulence within the reaction mixture also controls the size of the silicon crystals.

From a mechanical standpoint the use of the corrugated tube reactor takes advantage of a much sturdier piece of equipment and one with a longer operational life than that of the filament type of equipment used until now.

It also is to be understood that various modifications and changes may be made in the apparatus as described and in the procedures as given without departing from the scope of my invention since the description is illustrative and in no way is restrictive.

What I claim is:

1. In an apparatus for the production of elemental silicon in the form of non-adhesive curved pieces; the combination of means for interacting silicon tetrachloride and hydrogen, at substantially atmospheric pressure and at a temperature below the melting point of that metalloid while those reagents are present in essentially stoichiometric proportions, the apparatus comprising a laterally enterable, slightly deformable, tubular metallic reactor means, composed at least in part of tantalum, whose ratio of internal diameter to length varies throughout a considerable portion of its extent, the tubular metallic reactor being centered within and longitudinally traversing a gas-tight, electrically non-conductive, cylindrical, refractory housing with constricted ends closable by contact cap means partitioned for a part of its length by a cylindrical refractory septum partitioning the zone within said refractory housing into two concentric preheating chambers, each of these preheating chambers being equipped above and on each side of the septum with inlet means for the admission of the respective reagents and in which apparatus the end portions of the tubular metallic reactor are furnished with close fitting refractory bushings which pass through the contact caps, the lower bushing being fitted below with removable collector means which has a gas introduction means connected thereto for collecting and withdrawing the curved pieces of silicon and for the admission of gas to the collecting means and the upper bushing with means for the escape of gaseous materials, the apparatus also embodies means for cooling the contact caps which means likewise serve for supplying the electrical energy for the resistance heating of the tubular metallic reactor while the upper contact cap has means for reagent ingress.

2. In an apparatus for the production of elemental silicon according to claim 1 wherein the laterally enterable, slightly deformable, tubular metallic reactor consists of a tantalum tube corrugated along a median portion of its length and supplied with lateral openings below the corrugations, the total area of these openings being approximately equal to the average cross-sectional area of the tubular metallic reactor, the wall between the lateral openings being thickened, while those end portions of the tantalum tube wherein the ratio of internal diameter to the length is constant are furnished with close fitting refractory bushings, the lower bushing being fitted below with removable collector means comprising a ventable chamber for receiving the curved pieces of silicon while the upper bushing is fitted with means for the escape of the gaseous materials.

3. In an apparatus for the production of elemental silicon according to claim 1 in which the laterally enterable, slightly deformable, tubular metallic reactor has a tantalum lining.

4. In an apparatus for the production of elemental silicon in accord with claim 1 in which the refractory housing means for the tubular metallic reactor comprises a cylindrical shell of clear fused silica with constricted ends and on top inlet means for reagents, said refractory housing containing a concentric cylindrical refractory septum, likewise of fused silica, partitioning the zone within said refractory housing into two concentric preheating chambers which septum extends downward within the refractory housing to a position corresponding approximately to the lateral openings in the tubular metallic reactor while between said refractory septum and the tubular metallic reactor there is an inlet for the admission of reagent.

5. In an apparatus for the production of elemental silicon in accord with claim 1 in which the gaslight, electrically non-conductive, cylindrical refractory housing means are tightly closable by contact cap means of which one contact cap at least is removable, said contact caps having an internal sleeve for centering and closely encompassing those end portions of the metallic tubular reactor wherein the ratio of internal diameter to length is constant said contact caps also have a central opening to accommodate said close fitting refractory bushings, the upper of these contact caps having an inlet communicating with the space between said cylindrical refractory septum and the tubular metallic reactor both contact caps embody means for their cooling and for the supplying of electrical energy to the tubular metallic reactor.

6. In an apparatus for the production of elemental silicon in accord with claim 2 in which the close fitting refractory bushings are of smooth silica tubing, the lower bushing being fitted with a gas tight joint for accommodating removable collector means comprising a receiver with gas introduction means while the upper bushing includes means for the escape of gaseous materials.

No references cited.